United States Patent Office 3,299,019
Patented Jan. 17, 1967

3,299,019
DEHYDROFLUORINATION OF A COPOLYMER OF TRIFLUOROMETHYL VINYL ETHER AND TETRAFLUOROETHYLENE
Thomas Joseph Kealy, Wilmington, Del., assignor to E. I. du Pont de Nemours and Company, Wilmington, Del., a corporation of Delaware
No Drawing. Filed Mar. 26, 1963, Ser. No. 267,959
6 Claims. (Cl. 260—87.5)

This invention relates to novel curable copolymers. More particularly this invention relates to curable, partially dehydrofluorinated copolymers of trifluoromethyl vinyl ether and tetrafluoroethylene.

Fluorine-containing polymers which are elastomeric in nature are becoming increasingly important in elastomer technology. Many of them are outstanding in one or more properties, such as thermal stability and chemical resistance. However, among fluorine-containing polymers there is considerable variation with respect to individual properties, such as ease of curing, flexibility at low temperatures, and elasticity, which makes one specific fluoroelastomer particularly suitable for use when a certain combination of properties is desired. There is therefore a need for a variety of fluorine-containing elastomers to fill the requirements of a rapidly expanding technology.

It is an object of this invention to provide novel curable fluorine containing elastomeric compositions. A still further object is to provide a novel cured fluorine containing elastomer. Another object is to provide a process for curing these novel elastomeric copolymers. Other objects will appear hereinafter.

These and other objects are accomplished by providing a curable partially dehydrofluorinated copolymer of trifluoromethyl vinyl ether and tetrafluoroethylene which dehydrofluorinated copolymer exhibits infrared absorption bands at 3.25 microns and at 3.4 microns. More precisely the curable polymeric composition exhibits infrared absorption bands at 3.25 microns and at 3.4 microns, the absorption band at 3.25 microns having an intensity of about 10 to 40 percent of the intensity of the absorption band at 3.4 microns, said polymeric composition being a partially dehydrofluorinated copolymer which before dehydrofluorination consists essentially of about 50 to 75 mole percent of trifluoromethyl vinyl ether units and about 25 to 50 mole percent of tetrafluoroethylene units.

The absorption band at 3.25 microns is indicative of the presence of

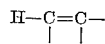

units in the polymer structure. The absorption band at 3.4 microns is characteristic of

units in the structure.

The polymers to be used as starting materials in preparing the compositions of this invention are copolymers containing about 50 to about 75 mole percent of trifluoromethyl vinyl ether units

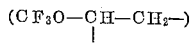

and about 25 to 50 mole percent of tetrafluoroethylene units (—$CF_2$—$CF_2$—). In this composition range copolymers of optimum elastomeric properties are obtained. The most preferred range is from about 60–70 mole percent of trifluoromethyl vinyl ether units and 30–40 mole percent of tetrafluoroethylene units. In general, the proportion of the units of the trifluoromethyl vinyl ether and the tetrafluoroethylene in the polymer is about the same as in the mixture of comonomers used as starting materials.

The initial copolymer before dehydrofluorination is prepared from tetrafluoroethylene which is a well-known compound and trifluoromethyl vinyl ether. Trifluoromethyl vinyl ether is prepared by dehydrohalogenation of 2-chloroethyl trifluoromethyl ether or 2-bromoethyl trifluoromethyl ether by means of an alkali metal hydroxide. The dehydrohalogenation is conveniently carried out by contacting the 2-chloro-(or 2-bromo-)ethyl trifluoromethyl ether with at least an equimolar quantity of an alkali metal hydroxide, e.g., potassium hydroxide. While the use of an inert reaction medium is not essential in this dehydrohalogenation process, it is preferred that one be employed. Suitable solvents are absolute ethyl alcohol or denatured alcohol as they dissolve the alkali metal hydroxide, and the dehydrohalogenation is conveniently carried out at the reflux temperature of the mixture. A dispersion of powdered alkali metal hydroxide in a high boiling hydrocarbon can also be employed.

The dehydrohalogenation takes place over a wide range of temperature, but temperatures of 50–80° C. are very satisfactory. Either 2-chloroethyl or 2-bromoethyl trifluoromethyl ether may be employed in this process. When 2-bromoethyl trifluoromethyl ether is employed, the trifluoromethyl vinyl ether is conveniently isolated from the reaction mixture by fractional distillation. When 2-chloroethyl trifluoromethyl is used, it is more difficult to separate the desired trifluoromethyl vinyl ether from the by-product vinyl chloride because of the closeness of their boiling points. Preparative gas chromatography may be used if pure trifluoromethyl vinyl ether is desired.

The 2-chloroethyl and 2-bromoethyl trifluoromethyl ether starting materials for the dehydrohalogenation process can be prepared by known methods. For example, 2-chloroethanol or 2-bromoethanol can be heated at 100–125° C. with carbonyl fluoride and the reaction product, after removal of excess carbonyl fluoride, can then be treated with sulfur tetrafluoride at temperatures of 100–175° C. The reaction mixture is then treated with a slurry of powdered sodium fluoride in xylene and the filtrate is distilled to obtain the 2-haloethyl trifluoromethyl ether.

Copolymerization of trifluoromethyl vinyl ether with tetrafluoroethylene is accomplished by bulk, solution, or emulsion polymerization methods in the presence of initiators yielding free radicals. Examples of suitable polymerization initiators are nitrogen fluorides (as disclosed in U.S. 2,963,468), azo compounds (as disclosed in U.S. 2,471,959) and organic or inorganic peroxy compounds, such as benzoyl peroxide and the salts of persulfuric acid. Examples of suitable solvents for the polymerization are octafluoro-1,4-dithiane and the cyclic dimer of hexafluoropropene. Aqueous emulsion polymerization may be carried out using well-known techniques. In an aqueous emulsion polymerization it is preferred to use ammonium, sodium, or potassium persulfate as the initiator because of the water solubility of these compounds and their ready availability. The amount of the initiator preferred in an aqueous emulsion polymerization ranges from about 0.05 to about 1 percent, based on the weight of monomers. If desired, alkali metal sulfites or bisulfites may be used with the persulfate catalysts to increase the rate of polymerization.

In an aqueous emulsion polymerization it is helpful to use an emulsifying agent. Suitable emulsifying agents are sodium, ammonium or potassium salts of long-chain fluorinated carboxylic acids. Examples are ammonium perfluorooctanoate and potassium omega-hydroperfluoroheptanoate.

The emulsion polymerization is carried out at moderately elevated temperatures in the range of 30 to 150°

C.; the preferred temperatures range from about 50° C. to about 90° C. The pressure is not critical. In general, the pressures used are those which normally develop in the closed system during the heating of the reaction mixture. The emulsion polymerization should preferably be carried out at alkaline pH's in the range of 7 to 10. It is sometimes helpful to use a buffering agent such as disodium hydrogen phosphate.

The polymerization should be carried out in the essential absence of oxygen. The reaction vessel should be one in which the surface exposed to the reaction mass is composed of an inert material such as stainless steel, glass, silver, platinum, etc.

The copolymers are removed from the polymerization system using known techniques. For example, in an aqueous emulsion polymerization the copolymer may be precipitated from the emulsion by addition of an aqueous sodium chloride solution. The polymer is then removed from the supernatant fluid, washed, and dried in conventional ways.

In preparing the partially dehydrofluorinated polymers of this invention, the copolymer is added to a solvent medium such as tetrahydrofuran, 1,2-dimethoxyethane, bis(2-methoxyethyl) ether, acetone, etc. The preferred medium is tetrahydrofuran because of the good solubility of the copolymers in this solvent. It is not essential that the copolymer be completely dissolved in the medium, although the medium should be one in which the copolymer is least partially soluble. It is preferred that the reaction be carried out in an inert atmosphere such as in an atmosphere of nitrogen.

To the mixture of polymer and the solvent is added a nitrogen base having a $K_b$ of at least $1 \times 10^{-5}$. Examples of suitable nitrogen bases include saturated nitrogen heterocyclic compounds, aliphatic primary, secondary, and tertiary amines, and ammonia. By the term "aliphatic" is here meant that the nitrogen atom is attached only to an aliphatic carbon atom, although the compound may contain aromatic rings in its structure. Specific examples of suitable organic bases are piperazine, morpholine, diethylamine, triethylamine, butylamine, and benzylamine.

The amount of nitrogen base to be added will depend somewhat on the activity of the particular base. In general, at least 20 parts by weight per 100 parts of polymer is required. The upper limit is primarily a question of practicality and economics. In general, there is no adavntage to be gained in adding more than 120 parts by weight of amine per 100 parts of polymer. The preferred amounts range from about 50 to 100 parts by weight of base per 100 parts of polymer.

After addition of the nitrogen base the mixture is heated to 50° C.–100° C. and maintained at this temperature until a sample of the treated copolymer exhibits an infrared absorption band at 3.25 microns as previously described. The time required will depend on the activity and amount of the base added and the temperature. In general, periods ranging from one to 12 hours should suffice. At temperatures of less than about 50° C. the reaction proceeds too slowly to be practical, and temperatures higher than about 100° C. are likely to be detrimental to the polymer. Preferred temperatures are in the range of 60–90° C. When lower boiling solvents are used it is convenient to carry out the reaction under reflux conditions. Atmospheric pressure is preferably used, although higher or lower pressures may be used if desired, depending on the boiling point of the medium and the nitrogen base.

Until the intensity of the infrared absorption band at 3.25 microns is about 10 percent that of the intensity of the band at 3.4, the copolymer is not significantly different from the parent copolymer. Vulcanizates of the dehydrofluorinated copolymer having optimum properties are obtained when the intensity of the band at 3.25 microns is in the range of about 10% to about 40% that of the band at 3.4 microns.

After the reaction has proceeded to the desired degree, the reaction is halted by discontinuing the heating, and the polymer may be separated from the reaction medium by conventional methods. If the solvent used is water-soluble, the mixture may be poured into water to precipitate the polymer. The polymer is then separated by filtration and washed with water to remove residual impurities. If the solvent is not water-soluble, the reaction mass may be extracted with water to remove the base and fluorides formed. The solvent may then be evaporated off and the polymer washed with water to remove residual impurities.

The dehydrofluorinated polymers may be cured by treatment with organic peroxy compounds, preferably in the presence of a free radical acceptor as described in U.S. Patent 2,958,672. Examples of suitable peroxy compounds are dicumyl peroxide, benzoyl peroxide, di-tert-butyl peroxide, methyl ethyl ketone peroxide, cumene hydroperoxide, tert-butyl perbenzoate, and 2,5-bis(tert-butylperoxy)-2,5-dimethylhexane. Examples of suitable free radical acceptors are triacryloylhexahydrotriazine and N-substituted maleimides and N,N'-substituted bismaleimides, such as N-methylmaleimide and N,N'-m-phenylenebismaleimide. Amounts of each of these agents to be used range from 0.5 to 6% by weight, based on weight of the polymer.

In carrying out the curing process the peroxide and the free radical acceptor are mixed with the copolymer using standard milling procedures, and the composition is heated until a cure is obtained. The temperature varies depending upon the particular peroxide and free radical acceptor. Heating to temperatures of about 50° C. to 200° C. for from 30 minutes to several hours is usually adequate. Conventional fillers, extenders, and pigments may be added to the copolymers of this invention if desired.

The dehydrofluorinated copolymers of this invention yield vulcanizates showing good thermal stability and chemical resistance. For example, they are not significantly attacked by hydrocarbon oils and chemicals such as aniline, alcohols, and aqueous acids and bases.

The dehydrofluorinated copolymers of this invention may be used in any of the applications for which the known fluoro-elastomers are generally used. This includes such uses as in molded goods, such as in O-rings, packings and seals; for coated fabrics to be used in fuel cells, diaphragms, and protective clothing; for hose, for wire insulation and for protective coatings.

The following examples will better illustrate the nature of the present invention; however, the invention is not intended to be limited to these examples. Parts are by weight unless otherwise indicated.

DEHYDROCHLORINATION OF 2-CHLOROETHYL TRIFLUOROMETHYL ETHER

A. A glass reaction vessel having three necks is fitted with a reflux condenser, a dropping funnel and a magnetic stirrer. Provision for collecting gaseous products is made by connecting the top of the condenser to a trap cooled by a mixture of acetone and solid carbon dioxide. The vessel is charged with 56 grams (1 mole) of potassium hydroxide in 210 ml. of 2B denatured alcohol. The reaction vessel is heated until the alcohol refluxes and there is then added dropwise, during a period of 60 minutes, 36.6 grams (0.246 mole) of 2-chloroethyl trifluoromethyl ether. At the end of the reaction, there is 15–16 ml. of condensate in the cold trap. Distillation of this material in a low temperature still gives 18.8 grams of crude trifluoromethyl vinyl ether boiling at −18° to −14° C. Analysis of this product by vapor phase chromatography shows that it is a mixture of two components in the ratio 76:24. The retention time of the smaller peak is in agreement with that of an authentic sample of vinyl chloride (B.P. −12° C.). Elemental analysis of the mixture shows that it contains 10.55% fluorine. On the assumption that the mixture is free of other impurities, this fluorine analysis indicates that the ratio of trifluoromethyl vinyl ether and vinyl chloride in the mixture is 71:29. An analytical sample of trifluoromethyl vinyl ether is separated from the mixture by preparative gas chromatography.

*Analysis.*—Calc'd for $C_3H_3F_3O$: F, 50.87%. Found: F, 50.91%.

The 2-chloroethyl trifluoromethyl ether used as the starting material in this example may be prepared as follows: A pressure vessel constructed of the corrosion-resistant alloy known commercially as "Hastelloy" and having a capacity of 145 ml. is charged with 61.2 grams (0.762 mole) of 2-chloroethanol and 75 grams (1.14 moles) of carbonyl fluoride. The mixture is heated at 100° C. for 1 hour and 125° C. for 2 hours. The reactor is cooled to room temperature and vented to remove excess carbonyl fluoride. The reactor is then closed and 90 grams (0.833 mole) of sulfur tetrafluoride is added and the mixture is heated at 100° C., 150° C. and 175° C. for 2 hours at each temperature. The reactor is cooled to room temperature and vented. The product remaining in the reactor is cautiously stirred into a slurry of 90 grams of powdered sodium fluoride in xylene. The mixture is filtered and the filtrate is distilled. There is obtained 48 grams of 2-chloroethyl trifluoromethyl ether, boiling at 62–65° C. and having a refractive index, $n_D^{25}$, of 1.3292. The fluorine and proton nuclear magnetic resonance spectra are consistent with the assigned structure.

*Analysis.*—Cal'd for $C_3H_4ClF_3O$: C, 24.26%; H, 2.71%; Cl, 23.87%; F, 38.80%. Found: C, 24.50%; H, 2.72%; Cl, 23.80%; F, 38.58%.

B. A mixture of 32 grams of 2-chloroethyl trifluoromethyl ether and 30 ml. of absolute ethyl alcohol is heated to reflux in a reaction vessel of the type described above. To this mixture is added in a slow but steady stream a solution of 18 grams of 85% potassium hydroxide in 120 ml. of absolute ethyl alcohol during a period of about 20 minutes. After the addition is completed the mixture is heated at reflux for another 30 minutes. The crude product is transferred by distillation directly from the trap to a receiver, 10 grams of distillate being obtained. This contains trifluoromethyl vinyl ether and can be used without further purification for subsequent reactions.

*Example 1*

A "Hastelloy-C" pressure vessel of 400 ml. capacity is charged with 0.7 part of ammonium persulfate, 2 parts of disodium hydrogen phosphate heptahydrate, 0.15 part of sodium sulfite, 0.3 part of ammonium perfluorooctanoate and 200 parts of deoxygenated water under a nitrogen atmosphere. The vessel is closed under nitrogen, cooled to about −80° C. and evacuated. Thirty-six parts of trifluoromethyl vinyl ether and 15 parts of tetrafluoroethylene are distilled into the vessel, and the vessel is closed and maintained at 60° C. for 2 hours. The vessel is cooled to room temperature and vented. The copolymer is precipitated by addition of an aqueous sodium chloride solution. The polymer is separated from the supernatant fluid, washed with water and with methanol, and dried in air. A 100% yield of polymer is obtained, which is a copolymer containing 68 mole percent of trifluoromethyl vinyl ether units and 32 mole percent of tetrafluoroethylene units. It has an inherent viscosity of 0.90, determined using a solution of 0.1 gram of polymer in 100 ml. of acetone at 30° C. The polymer is only 91 percent soluble in acetone.

To a solution of 45.4 parts of copolymer in 622 parts of tetrahydrofuran is added 45 parts of piperazine. The mixture is then refluxed for 6.5 hours. The reaction mixture, containing some precipitated solid, is then poured into water to precipitate the polymer. The copolymer is isolated by filtration, washed with fresh water, and dried at about 5° C. in a nitrogen atmosphere to obtain 41 parts of pale yellow copolymer having an inherent viscosity (0.1 gram in 100 ml. of acetone at 30° C.) of 1.01. The infrared spectrum of this copolymer contains a band at $3.25\mu$ and one at $3.40\mu$. The band at $3.25\mu$ is not present in the spectrum of the copolymer before treatment with piperazine. The intensity of this band is 22.5% of the intensity of the band at $3.4\mu$. Analysis for fluoride ion in the filtrate and washings from the copolymer treatment indicate that 0.1 mole of HF is removed from the polymer by amine treatment. The tetrafluoroethylene content of the polymer sample before treatment is 0.135 mole.

The copolymer is compounded using the following recipe

| | Parts by weight |
|---|---|
| Copolymer | 100 |
| Medium abrasion furnace black | 30 |
| 2,5-bis(tert-butylperoxy)-2,5-dimethylhexane | 1.5 |
| N,N'-m-phenylenebismaleimide | 0.75 |

The compounded polymer is cured in a mold under pressure at 165° C. for one hour. The following table shows the tensile properties obtained at 25° C. using an Instron tensile testing machine at a cross-head speed of 20 inches per minute. The method followed is ASTM D 412–51 T.

| | |
|---|---|
| Tensile strength at the break, p.s.i. | 1720 |
| Elongation at the break, percent | 260 |
| Modulus at 100% elongation, p.s.i. | 480 |
| Modulus at 200% elongation, p.s.i. | 1295 |

Similar results are obtained when the polymer is refluxed with 50 parts of piperazine per 100 parts of polymer.

Similar results are obtained when any one of the following is used instead of piperazine for treating the copolymer.

Morpholine
Diethylamine
Triethylamine
n-Butylamine
Ammonia

*Example 2*

A platinum tube is charged with 1.5 parts of trifluoromethyl vinyl ether, 1.5 parts of tetrafluoroethylene, 2 parts by volume of gaseous dinitrogen difluoride ($N_2F_2$) and 2 parts by volume of the saturated dimer of hexafluoropropene (as solvent). The tube is sealed and heated at 75° C. for 4 hours under an external pressure of 100 atmospheres. There is obtained 2.18 parts of a copolymer which analyzes for 62.04 percent fluorine. This indicates that it is a copolymer containing about 53 mole percent of trifluoromethyl vinyl ether units and 47 mole percent of tetrafluoroethylene units.

When the polymer is treated with piperazine as described in Example 1 there is obtained a copolymer which exhibits a band in the infrared spectrum at $3.25\mu$ which has an intensity 32% of the intensity of the band at $3.4\mu$. This copolymer is compounded and cured as described in Example 1 and gives similar results to those of Example 1.

*Example 3*

This example is carried out in the same way as Example 1 except that the monomer feed used in preparing the parent copolymer is 84 parts of trifluoromethyl vinyl ether and 25 parts of tetrafluoroethylene. The copolymer thus prepared contains about 75 mole percent of trifluoromethyl vinyl ether units and 25 mole percent of tetrafluoroethylene units. The copolymer, after treatment with piperazine, exhibits a band at 3.25 microns in the infrared spectrum which has an intensity about 15 percent that of the band at 3.4 microns. A sample of the copolymer is compounded and cured as described in Example 1 and gives similar results to those of Example 1.

As many widely different embodiments of this invention may be made without departing from the spirit and scope thereof, it is to be understood that this invention is not limited to the specific embodiments thereof except as defined in the appended claims.

What is claimed is:

1. A process which comprises dehydrofluorinating a copolymer which consists essentially of about 50 to 75 mole percent of trifluoromethyl vinyl ether units and about 25 to 50 mole percent of tetrafluoroethylene units by reaction with from 20 to 120 parts per 100 parts of copolymer of a nitrogen base having a $K_b$ of at least $1 \times 10^{-5}$ at a temperature of from 50 to 100° C. for a period of from 1 to 12 hours, until said copolymer exhibits an infrared absorption band at 3.25 microns which has about 10–40% of the intensity of the band at 3.4 microns.

2. A process which comprises dehydrofluorinating a copolymer which consists essentially of about 60 to 70 mole percent of trifluoromethyl vinyl ether units and about 30 to 40 mole percent tetrafluoroethylene units by reaction with from 50 to 100 parts per 100 parts of copolymer of a nitrogen base selected from the group consisting of piperazine, morpholine, diethylamine, triethylamine, butylamine, benzylamine and ammonia, at a temperature of from about 60 to 90° C. for a period of from 1 to 12 hours, until said copolymer exhibits an infrared absorption band at 3.25 microns which has about 10–40% of the intensity of the band at 3.4 microns.

3. The product produced by the process of claim 1.

4. A vulcanizate prepared by subjecting the product produced by the process of claim 1 to curing conditions in the presence of an organic peroxy compound and a free radical acceptor selected from the group consisting of triacryloylhexahydrotriazine, N-substituted maleimides, and N,N'-substituted bismaleimides, the amounts of each being from about 0.5 to 6 percent by weight of the copolymer product.

5. The vulcanizate of claim 4 wherein said organic peroxide is 2,5-bis(tert-butylperoxy)-2,5-dimethylhexane and said free radical acceptor is N,N'-m-phenylenebismaleimide.

6. The vulcanizate of claim 4 wherein said organic peroxide is benzoyl peroxide and said free radical acceptor is N-methylmaleimide.

References Cited by the Examiner

UNITED STATES PATENTS

| | | | |
|---|---|---|---|
| 2,958,672 | 11/1960 | Goldberg | 260—92.1 |
| 3,159,609 | 12/1964 | Harris et al. | 260—87.5 |
| 3,162,622 | 12/1964 | Aldrich | 260—87.5 |
| 3,180,895 | 4/1965 | Harris et al. | 260—614 |

OTHER REFERENCES

Hudlicky, Chemistry of Organic Fluorine Compounds, pp. 267–8, Macmillan (1962).

JOSEPH L. SCHOFER, *Primary Examiner.*

J. F. McNALLY, *Assistant Examiner.*